United States Patent Office

3,534,059
Patented Oct. 13, 1970

---

3,534,059
PRODUCTION OF INDOLES
Gene C. Robinson, Baton Rouge, La., assignor to Ethyl Corporation, New York, N.Y., a corporation of Virginia
No Drawing. Continuation-in-part of application Ser. No. 332,933, Dec. 23, 1963. This application June 26, 1967, Ser. No. 648,939
Int. Cl. C07d 27/56, 27/64
U.S. Cl. 260—319.1                                    15 Claims

ABSTRACT OF THE DISCLOSURE

The production of indoles by reacting an aromatic amine having at least one hydrogen attached to the nitrogen of the amino group and at least one hydrogen on the aromatic nucleus ortho to the amino group with a gem-dihalocyclopropane containing not more than one additional ring fused to the cyclopropane ring and at least one hydrogen on the cyclopropane ring.

CROSS REFERENCES TO RELATED APPLICATIONS

The present application is a continuation-in-part of application Ser. No. 332,933, filed Dec. 23, 1963 and now abandoned.

BACKGROUND OF THE INVENTION

By indole it is meant one of a group of organic heterocyclic compounds in which a benzene ring is fused to a pyrrole ring according to the following formula:

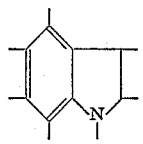

At present, indole syntheses are conducted by fusing a 5-membered N-heterocycle on a benzoic compound. Representative of the known processes is the Fisher indole syntheses, whereby a phenylhydrazone of an aldehyde or ketone on treatment with an acid is converted to an indole. Specifically, for example, when the starting material is the phenylhydrazone of acetone, the product is 2-methyl indole. Of further interest is U.S. Pat. 3,255,205, issued June 7, 1966, which discloses another process for making indoles, i.e. by effecting a reaction between an aromatic amine and a 2,3-dihalo-3-H-propene.

An object of the present invention is to provide a process for the production of indoles which is unique and which is more economically attractive than the processes heretofore known.

Other objects will become apparent from the following description of the invention.

SUMMARY OF THE INVENTION

A process for the production of indoles comprising contacting an aromatic amine and a gem-dihalocyclopropane at a temperature of from about 20° C. to about 300° C.; said aromatic amine containing from 6 to 12 nuclear carbon atoms, from 6 to about 40 carbon atoms in the total molecule, at least one hydrogen attached to the nitrogen of the amino group and at least one hydrogen on the aromatic nucleus ortho to the amino group, said gem-dihalocyclopropane containing not more than one additional ring fused to the cyclopropane ring, from 3 to about 60 carbon atoms in the total molecule, and at least one hydrogen on the cyclopropane ring.

DESCRIPTION OF THE PREFERRED EMBODIMENTS

The objects of the present invention are accomplished by effecting reaction between an aromatic amine and a gem-dihalocyclopropane.

The term gem-dihalocyclopropane refers to a group of compounds containing in the molecule the following structure wherein X is a halogen:

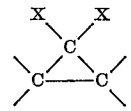

The gem-dihalocyclopropane reagents of this invention are further characterized in that they contain at least one hydrogen substituent on the cyclopropane ring, not more than one additional ring fused to the cyclopropane ring, from 3 to about 20 carbon atoms in the ring system and from 3 to about 60 carbon atoms in the total molecule. The gem-dihalocyclopropane reagents containing only the cyclopropane ring in the ring system are conveniently referred to as 1,1-dihalocyclopropanes and those having an additional ring fused to the cyclopropane ring are conveniently referred to as n,n-dihalobicyclo(n-3,1,0)-hydrocarbon compounds.

The n,n - dihalobicyclo(n - 3,1,0) - hydrocarbon compounds hereinafter referred to as the bicyclo reagent, are still further characterized in that they contain a cyclopropane ring to which is fused another cyclic hydrocarbon ring. The total number of carbon atoms in the fused ring system, i.e., the number of carbon atoms in the ring of the bivalent moiety which is attached at two points on the cyclopropane ring plus the three carbon atoms of the cyclopropane ring, ranges from 4 to about 20. The bicyclo reagent is further characterized in that the total molecule contains from 4 to about 60 carbon atoms and preferably from about 5 to about 30 carbon atoms. Therefore the simplest bicyclo reagent containing 4 carbon atoms in the fused ring system and a total of 4 carbon atoms in the molecule is 4,4-dihalobicyclo(1,1,0)-butane having the formula (I) 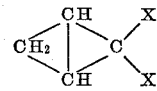

wherein X is a halogen. An example of a bicyclo reagent containing 20 carbon atoms in the fused ring system and a total of 20 carbon atoms in the molecule is 20,20-dihalobicyclo(17,1,0)-eicosane having the formula:

(II) 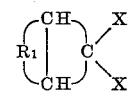

wherein X is hereinabove defined and wherein $R_1$ is an alkylene group having 17 carbon atoms. By the same token a bicyclo reagent having 7 carbon atoms in the fused ring system and having a total of 27 carbon atoms in the total molecule is 7,7-dihalobicyclo(4,1,0) - 2,5 - didecyl-heptane having the following formula:

(III) 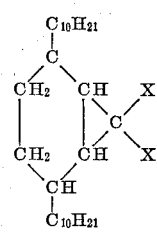

wherein X is as defined above.

Accordingly, the bicyclo reagent of the present process can be generally depicted by the formula:

(IV)

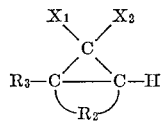

wherein $X_1$ and $X_2$ are halogens and may be the same or different; wherein $R_2$ is a bivalent hydrocarbon group characterized by being from 1 to about 17 carbon atoms in length; by containing a total of from 1 to about 50 carbon atoms in the substituents, if presents thereon (such substituents being selected from the group consisting of alkyl, cycloalkyl, aryl, aralkyl, cycloalkenyl, and aralkenyl, such substituents individually containing 1 to about 20 carbon atoms and most preferably 1–10 carbon atoms); by being composed of a chain of saturated carbon atom(s) or a chain of olefinically unsaturated carbon atoms either of which may be substituted by one or more of (a) said hydrocarbon substituents and/or (b) functional groups selected from the group consisting of hydroxyl, amino, halides, functionally substituted hydrocarbon groups which themselves contain such functional groups, alkoxy, cycloalkoxy, aryloxy, alkenoxy, cycloalkenoxy, and aralkenoxy groups, (the foregoing hydrocarbyloxyl groups may themselves be substituted with any of said functional groups); and by containing in the above described bivalent hydrocarbon group from 0 to about 4 (i.e. up to about 4) divalent groups taken from the following:

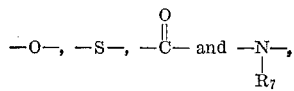

wherein $R_7$ is either hydrogen or a hydrocarbon group containing from 1 to about 24 carbon atoms. Thus, when the chain is a saturated chain it is an alkylene group which may or may not be interrupted at one or more portions thereof by one or more of the isolated divalent groups depicted and described above. On the other hand, when the chain is an olefinically unsaturated chain, it will generally contain from 1 to about 4 isolated ethylenic double bonds, and in addition, this chain may likewise be so interrupted. Generally speaking, $R_2$ is preferably a bivalent hydrocarbon group composed solely of carbon and hydrogen atoms. $R_3$ is hydrogen or the substituents hereinabove described for the group $R_2$.

The 1,1-dihalocyclopropane reagent of this process is a 1,1-dihalocyclopropane wherein the carbon atom in the 1 position is a monocyclic carbon atom. In other words, the carbon atom in the cyclopropane ring containing the 2 halogen atoms must only be a member of one ring, that is, said carbon atom is a member of a non-fused ring system. It is, of course understood that another carbon atom in the cyclopropane ring may be a member of a ring, that is, spiro-compounds are to be included as reagents in this invention, the only requirement being that one of the other carbon atoms is hydrogen substituted.

The 1,1-dihalocyclopropane is further defined by the following formula:

(V)

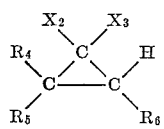

wherein $X_2$ and $X_3$ are halogens and may be the same or different and each R is hydrogen, an inorganic radical or an organic radical having from 1 to about 20 carbon atoms and preferably 1-10 carbon atoms. This reagent is further characterized in that the total molecule contains from 3 to about 60 carbon atoms and preferably from 3 to about 30 carbon atoms. A wide variety of inorganic radicals can be employed, for instance, halides, amino groups, hydroxyl groups, and the like. Preferably $R_4$, $R_5$, and $R_6$ are each selected from the group consisting of hydrogen, alkyl, cycloalkyl, alkenyl, cycloalkenyl, aryl, aralkyl, aralkenyl, alkoxy, cycloalkoxy, alkylnoxy, aryloxy, aralkoxy and aralkynoxy radicals. The aforesaid hydrocarbon and hydrocarbyloxy radicals may contain substituents such as halogens, hydroxy groups, amino groups and the like, and further said hydrocarbon and said hydrocarboxy radicals may contain up to about 4 divalent functional groups in the carbon chain selected from the groups consisting of

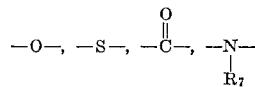

wherein $R_7$ is hydrogen or a hydrocarbon radical having from 1 to 20 carbon atoms.

Any of a wide variety of aromatic amines may be utilized in the process of this invention, the only requirement being that the amine contain at least one hydrogen substituent on the aromatic nucleus ortho to the amino group and at least one hydrogen atom on the amino group itself. The aromatic amine may be mono or polynuclear and may contain any of a wide variety of substituents on the nucleus and the nitrogen atom of the amino group. Preferably the aromatic amine is an aromatic monoamine containing not more than two fused benzene rings in the aromatic nucleus (that is from 6 to 12 nuclear carbon atoms) and from 6 to about 40 carbon atoms in the total molecule. The preferred amine reagent is depicted by the following structural formula:

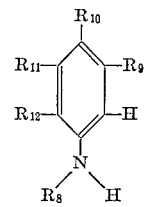

wherein each R is hydrogen, an inorganic radical such as a halide, or an organic radical having from 1 to about 20 carbon atoms and preferably 1–10 carbon atoms. Preferably $R_8$, $R_9$, $R_{10}$, $R_{11}$, and $R_{12}$ are each selected from the group consisting of hydrogen, alkyl, cycloalkyl, alkenyl, cycloalkenyl, aryl, aralkyl, aralkenyl, alkoxy, cycloalkoxy, alkynoxy, aryloxy, aralkoxy and aralkynoxy radicals. Preferably each R is selected from the group consisting of hydrogen and alkyl groups having from 1–10 carbon atoms.

The process is to be conducted at temperatures which are sufficient to produce the desired indole product but insufficient to decompose the product. These results are achieved by conducting the process at a temperature within the range of from about 20° C. to about 300° C. and preferably from about 150° C. to about 300° C. Of course, the preferred or optimum temperature varies between these ranges depending upon the specific reagents employed.

Generally speaking the process is conducted at autogenous pressures in a closed reaction vessel or at atmospheric pressure in a vessel equipped with a reflux condenser, due to the fact that the preferred reaction temperatures are above the boiling point of the reagents (the process of this invention is preferably conducted in the liquid phase). The pressures will vary between 0 and 2000 p.s.i.g. depending on the boiling points of the reagents employed. The reaction pressure may be reduced substantially according to another preferred embodiment, i.e. dissolving the reagents in a high boiling organic solvent which is inert to the reagents and product. This solvent should have a boiling point of between about 150° C. and 300° C. and preferably between 175° C. and 250° C. The solvent is generally employed in a molar excess, based on the gem-dihalobicyclopropane of about 10 to about 400 mole percent. Preferred solvents are hydrocarbons and ethers having 5–20 carbon atoms.

The reagents are generally employed in stoichiometric proportions owing to economic considerations, i.e. 1 mole of aromatic amine to 1 mole of gem-dihalocyclopropane. The proportions can however range from 10 moles to 1 mole of amine per mole of gem-dihalocyclopropane. Because the amine reagent is generally more readily available it is often preferred to employ it in an excess of from about 50–350 mole percent to insure efficient consumption of the gem-dihalocyclopropane reagent. Excellent re-

Example IV

Into a reaction vessel equipped with a heater, a thermometer, and a reflux condenser were charged 0.5 part of 7,7-dichlorobicyclo(4,1,0)heptane and 1.5 parts of aniline. The mixture was heated until a temperature of about 225° C. was achieved in the reaction zone. The reaction proceeded for 1 hour and heating was discontinued. The product was recovered in a 29 percent yield and was identified as 2,3-pentamethylene-indole.

In the following examples a procedure similar to Example I is employed except as otherwise indicated.

TABLE

[All runs conducted in a sealed vessel at autogenous pressure. Molar ratio of amine:gem-dihalocyclopropane about 3:1 in all runs]

| Run | Gem-dihalocyclopropane | Aromatic amine | Temp., ° C. | Product |
|---|---|---|---|---|
| V | 1,1-dichloro-2-dimethoxymethylcyclopropane | Aniline | 185 | Indole-3-acetaldehyde dimethyl acetal. |
| VI | 5-(2,2-dichlorocyclopropyl)hydantoin | do | 180 | 3-(5-hydantylmethyl)-indole. |
| VII | 1,1-dichloro-2-methoxymethylcyclopropane | do | 200 | 1-methoxy-2-(3-indolyl)-ethane. |
| VIII | 1,1-dichloro-2,2,3-trimethylcyclopropane | do | 173 | 2-methyl-3-isopropylindole. |
| IX | 1-methyl-6,6-dichlorobicyclo(3,1,0)hexane | p-Toluidine | 245 | 4,6-dimethyl-1,2,3,4-tetrahydrocarbazol. |
| X | 7,7-dichlorobicyclo(4,1,0)heptane | o-Methoxyaniline | 165 | 7-methoxy-2,3-pentamethylenoindole. |
| XI | 6,6-dibromobicyclo(3,1,0)hexane [1] | 3-allylaniline | 170 | 2,3-tetramethyleno-6-allylindole. |
| XII | 7-chloro-7-fluorobicyclo(4,1,0)heptane | 4-iodoaniline | 150 | 2,3-pentamethyleno-6-iodoindole. |
| XIII | 1,1-dichloro-2-phenylcyclopropane [2] | α-Naphthylamine | 299 | 2-phenyl-3-methyl-6,7-benzoindole. |
| XIV | 7-chloro-7-bromobicyclo(4,1,0)heptane [3] | N-n-amylaniline | 148 | N-m-amyl-2,3-pentamethylenoindole. |
| XV | 6,6-dichlorobicyclo(3,1,0)hexane [4] | 3-n-decyl-4-phenyl-aniline | 301 | 2,3-tetramethyleno-5-phenyl-6-n-decylindole. |

[1] Sodium hydroxide pellets added to reaction mixture.
[2] Calcium oxide flakes added to reaction mixture.
[3] Decane employed as solvent.
[4] Sodium oxide pellets added and diethylene glycol ether added as solvent.

sults are achieved when the molar ratio of amine to gem-dihalocyclopropane is at least about 3:1.

In order to insure high yields it is preferred though not required to add a basic metal compound to the reaction mixture. These compounds are preferably selected from the group consisting of alkali metal oxides, alkali metal hydroxides, alkaline earth metal oxides, and alkaline earth metal hydroxides. Other suitable compounds are the alkali and alkaline earth carbonates, bicarbonates, phosphates, borates and cyanides. These compounds are employed in a molar ratio (metal compound:gem-dihalocyclopropane) of 0.1:1 to 5:1 and preferably about 3:1.

In order that those skilled in the art may better understand the process of this invention the following working examples are given by way of description and not by way of limitation.

Example I

Into a reaction vessel equipped with an electric heating device and a thermometer were charged 4 parts of aniline and 2 parts of 6,6-dichlorobicyclo(3,1,0)hexane. The reaction vessel was sealed. The reaction mixture was heated until a temperature of 240° C. was attained. The reaction proceeded for about 4 hours and thereupon the heating was discontinued and the product recovered. 76 percent of tetrahydrocarbazole was obtained as the product.

Example II 4 parts of aniline and 1 part of 1,1-dichloro-2-methyl cyclopropane were charged into a reaction vessel equipped with a heater and a temperature recording device. Heat was applied to the reaction vessel until a temperature of 240° C. was attained. The reagents and the product formed which volatilized during the reaction were condensed in a reflux condenser and returned to the reaction zone. Heat was discontinued after 5 hours and the product was recovered. 40 percent of 2,3-dimethyl-indole was obtained.

Example III

A reaction vessel equipped with a heating device and a thermometer was charged with 1.5 parts of aniline and 0.5 part of 1,1-dichloro-cyclopropane. The reaction vessel was sealed in order to prevent loss of reagents during the reaction. Heat was applied until the temperature of the reaction zone was 280° C. The reaction proceeded for 3 hours when heating was discontinued. The vessel was opened and the product recovered. 2-methyl indole was recovered in a yield of 40 percent.

Especially preferred specific embodiments of this invention are as follows: producing indole-3-acetaldehyde dimethyl acetal by reacting aniline and 1,1-dihalo-2-dimethoxymethylcyclopropane. Also producing 3-(5-hydantylmethyl)-indole by reacting aniline and 5-(2,2-dihalocyclopropyl) - hydantoin. Excellent results are achieved in both the above reactions when they are conducted in the liquid phase and at temperatures of from about 150° C. to about 300° C. The above gem-dihalocyclopropanes are preferably gem-dichlorocyclopropanes. (See Examples V and VI.) These embodiments are preferred because the products thereof are useful in the production of important amino acids such as tryptophane.

Exemplary of specific bicyclo reagents which may be employed in this process are:

7-fluoro-7-chlorobicyclo(4,1,0)-heptane,
7-bromo-7-iodobicyclo(4,1,0)-heptane,
7-chloro-7-bromo-2,5-diethylbicyclo(4,1,0)-heptane,
7,7 - diiodobicyclo(4,1,0)-hexene-3,7,7-dibromo-5-phenyl-bicyclo(4,1,0)-heptane,
7,7-difluoro-6-eicosyl-3-ethoxybicyclo(4,1,0)-heptane,
7,7-dichloro-3-phenoxy-4-pentyl-bicyclo(4,1,0)-heptane,
7,7-dichloro - 1 - tolyl-6-pentyl-bicyclo(4,1,0)-hexadiene-2,4, and the like. Other bicyclo reagents are:

6,6-dichlorobicyclo(3,1,0)-hexane,
6,6-dibromo-1-isobutylbicyclo-(3,1,0)-hexene-2,
9,9-difluoro-2-methyl-4-octyl-6-phenoxy - bicyclo(6,1,0)-nonane,
9,9-dichlorobicyclo(6,1,0)-nonene-4,
7,7-dichloro-2-oxybicyclo(4,1,0)-heptane,
13,13-dichloro-bicyclo(10,10)-tridecadiene-3,7;20,20-dichlorobicyclo(17,1,0)-eicosane, and the like. Preferred bicyclo reagents are 6,6-dichlorobicyclo(3,1,0)-hexane, and
7,7-dichlorobicyclo(4,1,0)-heptane.

Exemplary of the 1,1-dihalocyclopropane reagents of this invention are 1,1-dichloro-2-n-propyl-cyclopropane,
1,1-dichloro-2,2-dimethyl-cyclopropane,
1,1-dichloro-2,2,3-trimethyl-cyclopropane,
1,1-dichloro-2-phenyl-cyclopropane,
1,1-dibromo-2-methylcyclopropane,
1,1-difluoro-2-methyl-cyclopropane, 1-fluoro-1-bromocyclopropane,
1,1-dibromo-2,3-diphenyl-cyclopropane,
1,1-dichloro-2-propyl-3-tolylcyclopropane,
1,1-difluoro-2-pentyl-3-naphthyl-cyclopropane,
1,1-dichloro-2-phenyl-3-cyclohexyl-cyclopropane,
1,1-dichloro-2-methyl-3-cyclopropyl-cyclopropane,
1,1-dichloro-2-methyl-3-ethenyl-cyclopropane,
1,1-difluoro-2-phenyl-3-ethenyl-cyclopropane,
1,1-dihalo-2-butenyl-3-isopropyl-cyclopropane,
1,1-dihalo-2-methyl-3-propenyl-cyclopropane,
1,4-dibromo-2-isopropyl-3,3-trimethylene-cyclopropane,
1,1-dichloro-2,2-dimethoxy-cyclopropane,
1,1-dichloro-2,3-didecyl-cyclopropane,
1,1-dibromo - 2 - dodecyl-2-methyl-3-octadecyl-3-phenyl-cyclopropane, and the like. Preferred are 1,1-dichloro-2-dimethoxymethylcyclopropane,
4-(2,2-dichlorocyclopropyl)hydantoin,
1,1-dichloro-2-methyl cyclopropane, and
1,1-dichlorocyclopropane.

The gem-dihalocyclopropane reagents of this invention may be prepared according to any of the procedures described in the art. For instance, 1,1-dichloro-2-methylcyclopropane is produced by first reacting metallic potassium and tertiary butyl alcohol followed by the reaction of the metal alcoholate so produced with chloroform in the presence of propylene. Another procedure comprises reacting potassium hydroxide and chloroform in the presence of an olefin. For further discussion see "The Addition of Dihalocarbene to Olefins" by Doering and Hoffman, J. of Am. Chem. Soc., 76, 6162 (1954).

Exemplary of the metal compounds are sodium oxide, lithium oxide, potassium oxide, rubidium oxide, cesium oxide, beryllium oxide, magnesium oxide, calcium oxide, strontium oxide, barium oxide, sodium hydroxide, lithium hydroxide, potassium hydroxide, rubidium hydroxide, cesium hydroxide, beryllium hydroxide, magnesium hydroxide, calcium hydroxide, strontium hydroxide, barium hydroxide, sodium carbonate, lithium carbonate, potassium carbonate, rubidium carbonate, cesium carbonate, beryllium carbonate, magnesium carbonate, calcium carbonate, sodium bicarbonate, potassium bicarbonate, lithium phosphate, sodium phosphate, potassium phosphate, beryllium phosphate, magnesium phosphate, calcium phosphate, sodium borate, potassium borate, beryllium borate, magnesium borate, calcium borate, sodium cyanide, potassium cyanide, magnesium cyanide, calcium cyanide, and the like. Preferred are sodium oxide, sodium hydroxide, calcium oxide and calcium hydroxide.

Exemplary of the aromatic amines which are used in the present process are 4-isobutyl aniline,
5-ethenyl-6-chloro-aniline,
ortho-anisidine,
benzidine,
meta-chloro-aniline,
ortho-chloro-aniline,
p-chloro-aniline,
2,3,4,5,6-pentamethyl aniline,
ortho-chloro-p-anisidine,
4-hydroxy aniline,
ortho-dianisidine,
2,5-dichloroaniline,
3,3'-dichlorobenzidine,
N-ethyl-alpha-naphthylamine,
N-ethyl-ortho-toluidine,
alpha-naphthyl amine,
beta-naphthyl amine,
ortho-toluidine,
p-toluidine,
6-phenoxy aniline,
4-cyclohexyl aniline, and the like. The preferred aromatic amine is aniline.

The following are solvents which may be employed if desired in this process: nonane, isopropyl benzene, alpha-pinene, disoamyl, ether, decane, decahydronaphthalene, dimethyl naphthalene, naphthalene, diethylene, glycol dimethyl ether, dibutyl maleate, benzyl ether, dibutyl phthalate, and dibutyl sebacate.

The indoles produced according to this process are known to have many diverse uses. For example, tetrahydrocarbazole can be made into carbazole by a known synthesis, see Kirk-Othmer, Encyclopedia of Chemical Technology, 2nd Ed., vol. II, p. 594; uses of carbazole include manufacture into dyes, e.g. hydron-blue, see vol. 10, p. 910 of the above mentioned Encyclopedia, and polymers of n-vinylcarbazole, useful as electrical insulation, see U.S. Pat. 2,472,085. Another indole of the present invention, 2-methyl indole, can be used to prepare 2-indole carboxylic acid by alkali fusion, see Ciamician and Zatti, Ber. vol. 21, p. 1930 (1888), which in turn can be decarboxylated to indole, see Fischer, Ann. vol. 236, p. 144. Indole has several uses including perfumery, see the above mentioned Encyclopedia, 2nd Ed., vol. II, p. 585, synthesis of tryptophane which is an essential amino acid useful as an animal feed supplement, see p. 590 of the last mentioned Encyclopedia, and synthesis of heteroauxin useful as a plant growth regulator, see p. 589 of the last mentioned Encyclopedia. Yet another indole of the present invention, 3-(5-hydantylmethyl)-indole, can be hydrolyzed, see Fieser and Fieser, Organic Chemistry, 3rd Ed. (1956), p. 215, to tryptophane having the above described utility. Other compounds of the present invention useful as or convertible to indoles of the above described utility include 2,3-dimethyl-indole, 2,3-pentamethylenoindole, indole-3-acetaldehyde dimethyl acetal, 1-methoxy-2-(3-indolyl)-ethane and 2-methyl-3-isopropylindole. 4,6 - dimethyl-1,2,3,4-tetrahydrocarbazol is useful to prepare a substituted carbazole of the above described utility. 2,3-tetramethyleno-6-allylindole may be converted to a monomer. Each of 7-methoxy-2,3-pentamethylenoindole, 2,3 - pentamethyleno - 6 - iodoindole, 2-phenyl - 3 - methyl-6,7-benzoindole, N-n-amyl-2,3-pentamethylenoindole, and 2,3 - tetramethyleno-5-phenyl-6-n-decyl-indole may be used as a nematocide, fungicide or bactericide.

I claim:

1. A process for the production of indoles comprising contacting an aromatic hydrocarbyl amine and a gem-dihalocyclopropane hydrocarbon at a temperature of from about 20° C. to about 300° C.; said aromatic hydrocarbyl amine containing from 6 to 12 nuclear carbon atoms, up to 40 carbon atoms in the total molecule, one or more substituents each selected from the group consisting of hydrogen, halide, alkyl, cycloalkyl, alkenyl, cycloalkenyl, aryl, aralkyl, aralkenyl, alkoxy, cycloalkoxy, alkynoxy, aralkoxy, aralkynoxy and aryloxy radicals, at least one hydrogen attached to the nitrogen of the amino group and at least one hydrogen on the aromatic nucleus ortho to the amino group, said gem-dihalocyclopropane hydrocarbon consisting essentially of the cyclopropane ring or of the cyclopropane ring with not more than one additional hydrocarbyl ring fused thereto, said additional ring having up to 17 carbon atoms, exclusive of those carbon atoms which are also members of the cyclopropane ring, and being unsubstituted or having attached thereto one or more hydrocarbyl, halohydrocarbyl or hydrocarbyloxy substituents containing a total of up to 50 carbon atoms and individually up to 20 carbon atoms, from 3 to 60 carbon atoms in the total molecule, of which carbon atoms from 3 to 20 are ring carbon atoms, and at least one hydrogen on the cyclopropane ring.

2. The process of claim 1 wherein said gem-dihalocyclopropane is a 1,1-dichlorocyclopropane.

3. The process of claim 1 wherein said gem-dihalocyclopropane is an n,n - dihalobicyclo(n - 3,1,0)hydrocarbon compound with $n$ being a whole number from 4 through 20.

4. The process of claim 1 conducted at a temperature of about 150° C. to about 300° C.

5. The process of claim 1 wherein a basic metal compound is added to the reaction mixture, said basic metal compound being selected from the group consisting of alkali and alkaline earth metal oxides and hydroxides.

6. The process of claim 1 conducted in an organic solvent having a boiling point of between about 150° C. and 300° C.

7. The process of claim 1 wherein said aromatic amine is aniline.

8. The process of claim 1 wherein said gem-dihalocyclopropane is 6,6-dichlorobicyclo(3,1,0)-hexane.

9. The process of claim 1 wherein said gem-dihalocyclopropane is 1,1-dichloro-2-methylcyclopropane.

10. The process of claim 1 wherein said gem-dihalocyclopropane is 1,1-dichloro-cyclopropane.

11. The process of claim 1 wherein said gem-dihalocyclopropane is 7,7-dichlorobicyclo(4,1,0)-heptane.

12. The process of claim 1 wherein said gem-dihalocyclopropane is 1,1 - dichloro - 2 - dimethoxymethylcyclopropane.

13. The process of claim 1 wherein said aromatic amine is aniline and said gem-dihalocyclopropane is 1,1-dichlorocyclopropane, whereby 2-methyl indole is produced.

14. The process of claim 1 wherein said aromatic amine is aniline and said gem-dihalocyclopropane is 1,1-dichloro-2-dimethoxymethylcyclopropane, whereby indole-3-acetaldehyde dimethyl acetal is produced.

15. The process of claim 14 further characterized in that for each mole of 1,1-dichloro-2-dimethoxymethylcyclopropane there are at least about 3 moles of aniline.

References Cited

UNITED STATES PATENTS 2,607,779   8/1952   Towne et al. _____ 260—319.1

NATALIE TROUSOF, Primary Examiner

U.S. Cl. X.R.

260—309.5, 313.1, 315, 326.12, 326.13, 326.14, 326.15, 326.16, 571, 574, 575, 576, 577 578, 611, 612, 648, 649, 650, 999